US011247604B1

(12) United States Patent
Kim et al.

(10) Patent No.: US 11,247,604 B1
(45) Date of Patent: Feb. 15, 2022

(54) VEHICLE MUDGUARD LIGHTING DEVICE

(71) Applicants: HYUNDAI MOTOR COMPANY, Seoul (KR); KIA CORPORATION, Seoul (KR)

(72) Inventors: Taehyung Kim, Incheon (KR); Jungho Kim, Seoul (KR); Jinwoo Kim, Suwon-si (KR); Jung Joong Lee, Suwon-si (KR); Byungho Kong, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/221,536

(22) Filed: Apr. 2, 2021

(30) Foreign Application Priority Data

Dec. 10, 2020 (KR) .......................... 10-2020-0172643

(51) Int. Cl.
*B60Q 1/24* (2006.01)
*B62D 25/18* (2006.01)
*B60Q 1/26* (2006.01)

(52) U.S. Cl.
CPC ............ *B60Q 1/24* (2013.01); *B60Q 1/2661* (2013.01); *B62D 25/18* (2013.01); *B62D 25/184* (2013.01); *B60Q 2400/50* (2013.01)

(58) Field of Classification Search
CPC .... B60Q 1/24; B60Q 1/2661; B60Q 2400/50; B60Q 1/32; B60Q 1/2692; B60D 25/184; B60D 25/18; B60D 25/182; B60D 25/186; B60D 25/188; B60D 25/16; B60D 25/161; B60D 25/165; B60D 25/166; B60D 25/168
USPC ...................... 362/487, 523, 524; 353/12, 13
See application file for complete search history.

(56) References Cited

U.S. PATENT DOCUMENTS

| 4,413,839 | A  | * | 11/1983 | McCain ............... | B62D 25/168 280/851 |
| 9,126,531 | B1 | * | 9/2015 | Adams ..................... | B60Q 1/44 |
| 9,221,390 | B1 | * | 12/2015 | Begley ................. | B62D 25/188 |
| 9,707,912 | B1 | * | 7/2017 | Pena Casimiro .... | B60Q 1/2665 |
| 10,829,036 | B2 | * | 11/2020 | Sugiyama ............... | F21S 41/43 |
| 10,933,921 | B1 | * | 3/2021 | Jacobson ................ | F21V 33/00 |
| 2003/0107900 | A1 | * | 6/2003 | Ellison ................... | B60Q 1/484 362/485 |
| 2011/0273671 | A1 | * | 11/2011 | Chu ....................... | G03B 21/14 353/13 |
| 2018/0141486 | A1 | * | 5/2018 | Stinson ................... | B60R 3/002 |
| 2018/0222380 | A1 | * | 8/2018 | Lenz ..................... | B60Q 1/323 |
| 2018/0361915 | A1 |   | 12/2018 | Kuhl et al. |  |

* cited by examiner

*Primary Examiner* — Laura K Tso
(74) *Attorney, Agent, or Firm* — Lempia Summerfield Katz LLC

(57) ABSTRACT

A vehicle mudguard lighting device includes: a mudguard fixing unit attached to the vehicle wheel guard and having a motor therein; a mudguard rotating unit rotatably attached to the mudguard fixing unit and including a lighting device for irradiating light; an external connector for supplying power to the motor and the lighting device; and a controller, where the controller is configured to determine whether power is supplied to the motor and the lighting device, to control whether power is supplied to the external connector, and to adjust a rotation angle of the mudguard rotating unit through the motor.

13 Claims, 11 Drawing Sheets

VEHICLE MUDGUARD LIGHTING DEVICE

CROSS-REFERENCE TO RELATED APPLICATION

This application claims priority to and the benefit of Korean Patent Application No. 10-2020-0172643 filed in the Korean Intellectual Property Office on Dec. 10, 2020, the entire contents of which are incorporated herein by reference.

BACKGROUND

(a) Field of the Disclosure

The present disclosure relates to a vehicle mudguard lighting device. More particularly, the present disclosure relates to a vehicle mudguard lighting device in which a rotatable lighting device is mounted on the mudguard of the vehicle.

(b) Description of the Related Art

In general, a mudguard installed on a vehicle is a member installed at the rear of a vehicle wheel to prevent bouncing stones, mud, dust, rainwater, and the like from a tire from splashing to the rear of the vehicle during driving of the vehicle. The mudguard is typically made of rubber or plastic material.

A technology in which a lighting device structure is provided in such a mudguard has been developed. In this technology, the lighting device structure is mainly provided at the lower end of the front outer surface of the side seal molding of the vehicle, and serves to irradiate the ground.

However, when the lighting device structure is installed on the outer surface of the side seal molding, design restrictions of the vehicle occur, the appearance quality deteriorates, and it is then difficult to make an option in a vehicle model that does not apply or include the side seal molding. In addition, it is difficult to obtain a lighting effect in a bright space or during the day. Also, since the irradiation direction of the lighting device is fixed, there is a limitation in expressing the individuality of the vehicle.

The above information disclosed in this Background section is only to enhance understanding of the background of the disclosure. Therefore, the Background section may contain information that does not form the prior art that is already known in this country to a person of ordinary skill in the art.

SUMMARY

The present disclosure has been made in an effort to provide a vehicle mudguard lighting device that is advantageous in making different vehicle options and can realize an improved lighting effect by providing a rotating lighting device inside the mudguard regardless of the presence or absence of a side seal molding of the vehicle.

A vehicle mudguard lighting device according to an embodiment of the present disclosure includes: a mudguard fixing unit attached to the vehicle wheel guard and having a motor therein; a mudguard rotating unit rotatably attached to the mudguard fixing unit and including a lighting device for irradiating light; an external connector for supplying power to the motor and the lighting device; and a controller. The controller is for determining whether power is supplied to the motor and the lighting device, controlling whether power is supplied to the external connector, and adjusting a rotation angle of the mudguard rotating unit through the motor.

At the mudguard fixing unit, a first gear may be connected to and rotated with a central axis of the motor and a power supply connector may be provided for transferring the current supplied from the external connector to the mudguard rotating unit.

At the mudguard rotating unit, a second gear may be engaged with the first gear to rotate and a device connection unit may be provided for receiving current from the power supply connector and supplying power to the lighting device.

The mudguard fixing unit and the mudguard rotating unit may be in surface contact with each other at an inclined angle and the first gear and the second gear may engage with each other at an inclined angle.

The first gear and the second gear may be rotating hyperboloidal gears.

At the contact surface portion of the mudguard fixing unit and the mudguard rotating unit, an opening may be formed in a contact surface of the mudguard fixing unit in contact with the mudguard rotating unit. A second gear of the mudguard rotating unit may be inserted into the opening to engage with the first gear of the mudguard fixing unit.

The power supply connector and the device connection unit may be connected by electric wires that are in electrical contact with each other around the outside of the opening.

A bearing may be mounted around the inner circumference of the opening.

A heating wire that receives current from the power supply connector and generates heat may be mounted around the outer circumference of the opening.

A brush protrusion may be formed on a contact surface of the mudguard fixing unit in contact with the mudguard rotating unit.

At the mudguard rotating unit, a transparent cover may be installed in a direction perpendicular to the light irradiation direction of the lighting device.

A pattern may be formed on the transparent cover so that a pictogram is projected when the lighting device irradiates light.

The lighting device may be an LED device.

As described above, according to the present disclosure, it is possible to make different vehicle options regardless of the presence or absence of a side sill molding by the rotating lighting device installed on the vehicle's mudguard.

In addition, even at bright times and places, a lighting effect can be obtained by irradiating light (pictogram) to the shadow area under the vehicle.

In addition, since the irradiation direction of light can be rotated, the individuality of the driver can be expressed, and effects such as a mood outside the vehicle can be obtained.

DETAILED DESCRIPTION OF THE EMBODIMENTS

Figure 1:
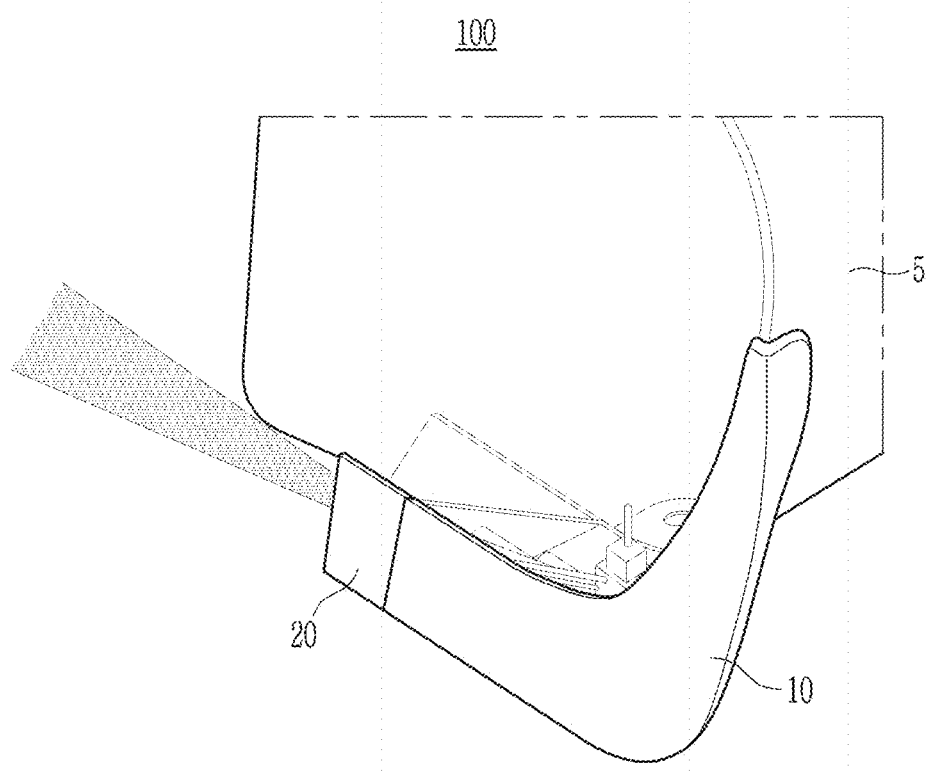
FIG. 1 is a view showing a state in which a vehicle mudguard lighting device is mounted on a wheel guard according to an embodiment of the present disclosure.

Hereinafter, the present disclosure is described more fully with reference to the accompanying drawings, in which embodiments of the disclosure are shown. As those of ordinary skill in the art should realize, the described embodiments may be modified in various different ways, all without departing from the spirit or scope of the present disclosure.

Further, in specific embodiments, since like reference numerals designate like elements having the same configuration, a first embodiment is representatively described. In other embodiments, only configurations different from the first embodiment are be described.

The drawings are schematic and are not illustrated in accordance with a particular scale. Relative dimensions and ratios of portions in the drawings are illustrated to be exaggerated or reduced in size for clarity and convenience and the dimensions are just exemplified and are not limiting. In addition, like structures, elements, or components illustrated in two or more drawings use the same reference numerals for showing the same or similar features. It should be understood that when an element such as a layer, film, region, or substrate is referred to as being "on" another element, it can be directly on the other element or intervening elements may also be present.

The embodiment of the present disclosure shows an embodiment of the present disclosure in detail. As a result, various modifications of the drawings should be expected. Therefore, the embodiment is not limited to a specific aspect of the illustrated region and thus, for example, may include modifications of an aspect for manufacturing purposes.

A vehicle mudguard lighting device according to an embodiment of the present disclosure is described with reference to the accompanying drawings. When a component, device, element, unit, or the like of the present disclosure is described as having a purpose or performing an operation, function, or the like, the component, device, element, or unit should be considered herein as being "configured to" meet that purpose or to perform that operation or function. Further, the controller described herein may include a processor programmed to perform the noted operations, functions, or the like.

Figure 2:
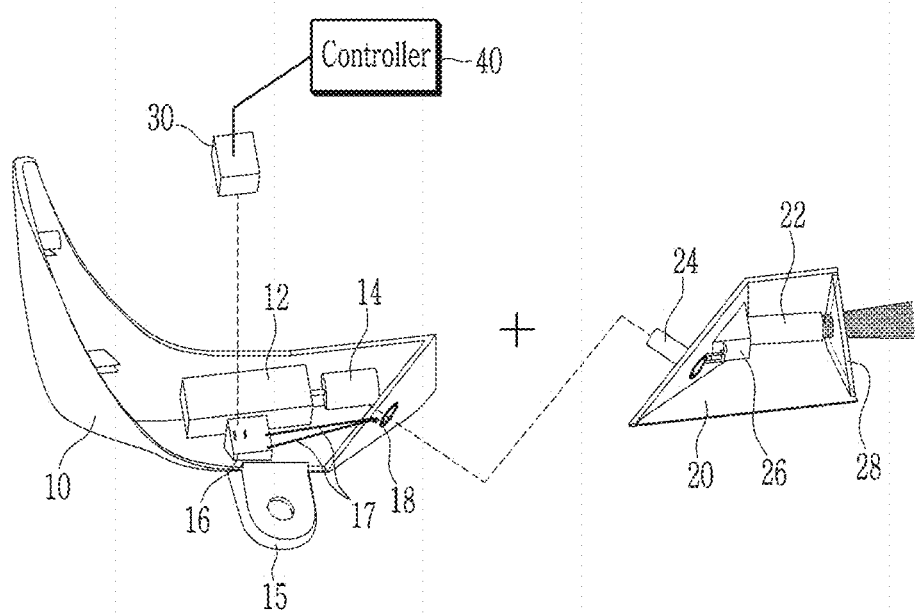
FIG. 2 is an exploded view showing a vehicle mudguard lighting device according to an embodiment of the present disclosure.
Figure 3:
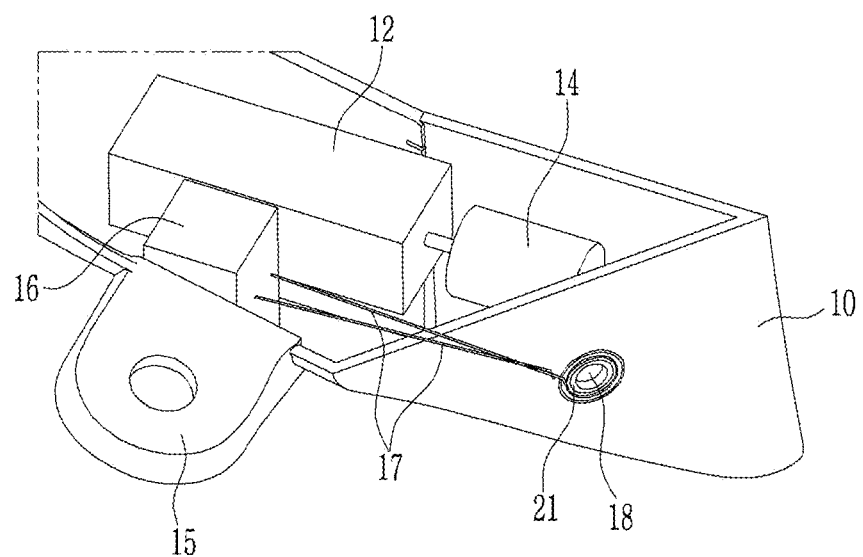
FIG. 3 is a view showing a mudguard fixing unit of the vehicle mudguard lighting device according to an embodiment of the present disclosure.
Figure 4:
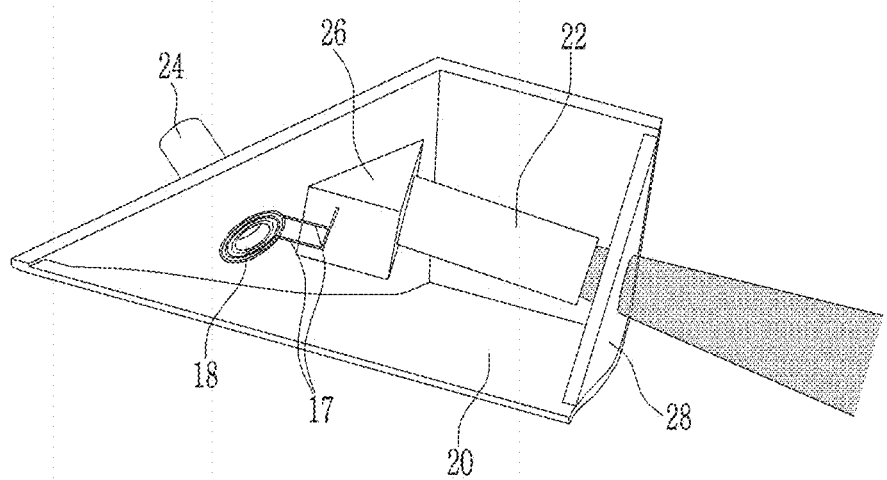
FIG. 4 is a view showing a mudguard rotating unit of the vehicle mudguard lighting device according to an embodiment of the present disclosure.
Figure 5A:
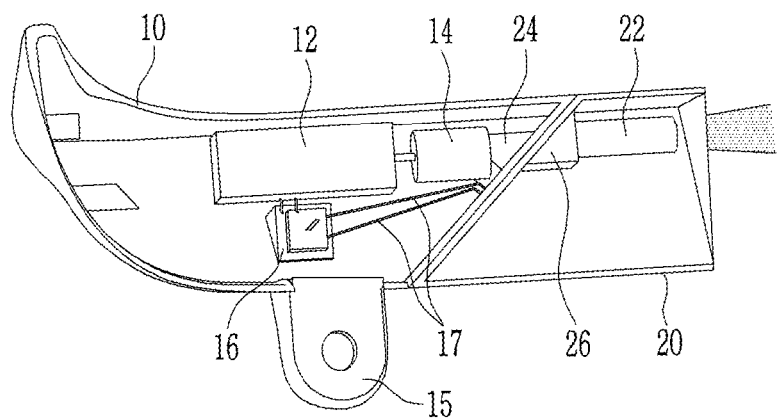
FIGS. 5A-5D are views showing rotating states of the mudguard rotating unit of the vehicle mudguard lighting device according to an embodiment of the present disclosure.
Figure 5B:
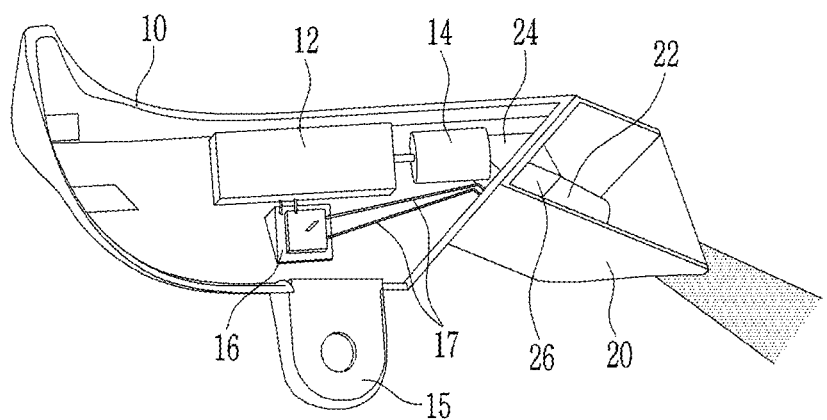
Figure 5C:
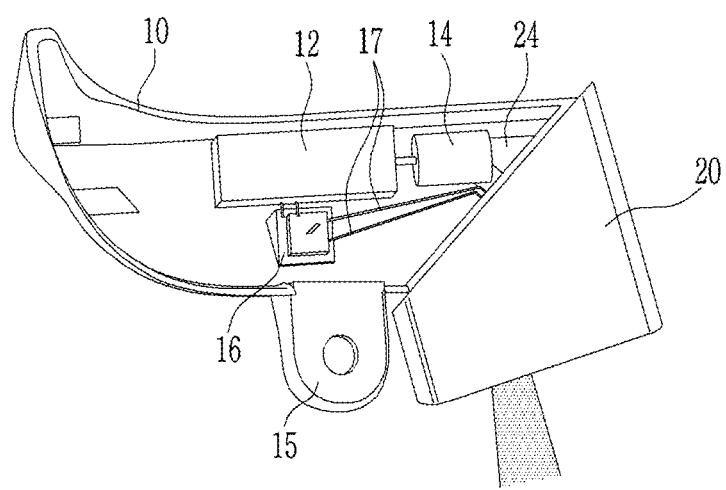
Figure 5D:
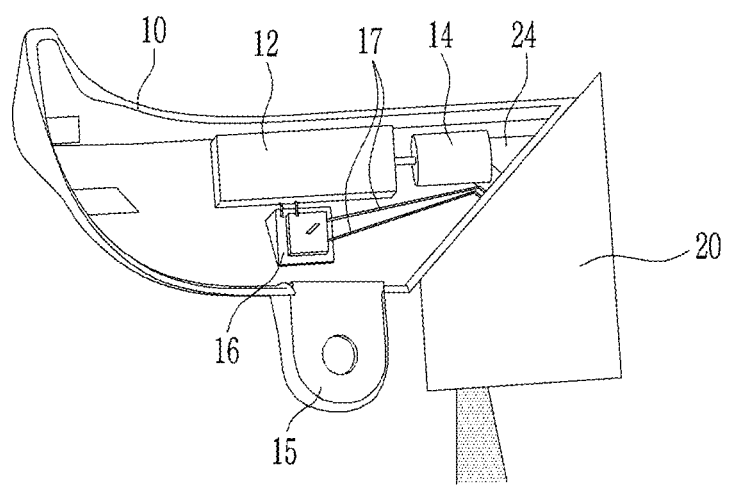

FIG. 1 is a view showing a state in which a vehicle mudguard lighting device is mounted on a wheel guard according to an embodiment of the present disclosure. FIG. 2 is an exploded view showing a vehicle mudguard lighting device according to an embodiment of the present disclosure. FIG. 3 is a view showing a mudguard fixing unit of the vehicle mudguard lighting device according to an embodiment of the present disclosure. FIG. 4 is a view showing a mudguard rotating unit of the vehicle mudguard lighting device according to an embodiment of the present disclosure.

Referring to FIG. 1 and FIG. 2, the vehicle mudguard lighting device according to an embodiment of the present disclosure is attached to a wheel guard 5 of a vehicle 100. The vehicle mudguard lighting device includes a mudguard fixing unit 10, a mudguard rotating unit 20, an external connector 30, and a controller 40.

The vehicle mudguard lighting device may be attached to the inside of the wheel guard 5 so that it is not visible from the outside. A mudguard fixing member 15 may be formed in the mudguard fixing unit 10. The mudguard fixing member 15 may be fixed inside the wheel guard 5 by screwing or the like. In addition, a motor 12 may be provided inside the mudguard fixing unit 10.

The mudguard rotating unit 20 is rotatably attached to the mudguard fixing unit 10 and may include a lighting device 22 that irradiates light. The lighting device 22 may be or include an LED device that irradiates LED light.

The mudguard fixing unit 10 and the mudguard rotating unit 20 may be in surface contact with each other at an inclined angle. The light irradiation direction of the lighting device 22 may be changed according to the rotation of the mudguard rotating unit 20. The lighting device 22 irradiates light toward the opposite side of the area where the mudguard fixing unit 10 and the mudguard rotating unit 20 are in contact with each other.

The external connector 30 may supply power to the motor 12 and the lighting device 22. The controller 40 determines whether power is supplied to the motor 12 and the lighting device 22 and may supply power to the external connector 30 when it is determined that power is not supplied In addition, the controller 40 may change the direction of light irradiation by adjusting the rotation angle of the mudguard rotating unit 20 through the motor 12. In this case, the controller may be implemented by one or more processors operating according to a set program. The set program may be programmed to perform each step of the operation of the vehicle mudguard lighting device according to an embodiment of the present disclosure.

Inside the mudguard fixing unit 10, a first gear 14 may be connected to the central axis of the motor 12 and protrude to the outside of the motor 12 to rotate. A power supply connector 16 for supplying current to the motor 12 may be provided.

In addition, at the mudguard rotating unit 20, a second gear 24 may be provided to rotate in engagement with the first gear 14 of the motor 12. A device connecting unit 26 that receives current from the power supply connector 16 may be provided in the mudguard fixing unit 10 and may supply power to the lighting device 22.

In response to the mudguard fixing unit 10 and the mudguard rotating unit 20 in contact with each other at an inclined angle, the first gear 14 and the second gear 24 may be provided to engage with each other at an inclined angle. When the first gear 14 rotates by the driving of the motor 12, the second gear 24 engaged therewith rotates, so that the mudguard rotating unit 20 may rotate.

The first gear 14 and the second gear 24 may be rotating hyperboloidal gears. The rotating hyperboloidal gear is a gear that transmits rotation between two axes that do not intersect with a part of the rotational hyperbola as a pitch surface. The axes of the first gear 14 and the second gear 24 do not intersect, and the pitch surfaces of the first gear 14 and the second gear 24 are in contact with each other. As the first gear 14 rotates, the rotational force of the motor 12 may be transmitted to the second gear 24.

Meanwhile, an opening 18 may be formed in a contact surface of the mudguard fixing unit 10 in contact with the mudguard fixing unit 10 at a contact surface between the mudguard fixing unit 10 and the mudguard rotating unit 20. The second gear 24 of the mudguard rotating unit 20 is inserted into the opening 18 so as to engage with the first gear 14 of the mudguard fixing unit 10.

A bearing 21 may be mounted around the inner circumference of the opening 18 for smooth rotation of the mudguard fixing unit 10 and the mudguard rotating unit 20.

Meanwhile, around the outer circumference of the opening 18, the power supply connector 16 and the device connection unit 26 may be connected to each other by an electric wire 17 so as to be in electrical contact with each other. In other words, the electric wire 17 connected to the power supply connector 16 is provided around the outside circumference of the opening 18 of the contact surface of the mudguard fixing unit 10. The electric wire 17 connected to the device connection unit 26 is provided around the lower circumference of the second gear 24 on the contact surface of the mudguard rotating unit 20 so that the electric wires 17 can be electrically connected to each other outside the opening 18. Accordingly, current can be supplied to the lighting device 22 from the power supply connector 16 through the device connection unit 26.

FIGS. 5A-5D are views showing rotating states of the mudguard rotating unit of the vehicle mudguard lighting device according to an embodiment of the present disclosure.

Referring to FIGS. 5A-5D, the controller 40 supplies current to the power supply connector 16 of the mudguard fixing unit 10 through the external connector 30 when a condition for lighting under the vehicle is determined or occurs. The supplied current is transmitted to the motor 12 and the lighting device 22 through the electric wire 17.

When the motor 12 rotates, the rotation axis is changed in an inclined direction through the rotation hyperboloidal gears 14 and 24 to transmit the rotational motion. As the mudguard rotating unit 20 rotates, the light irradiation direction of the lighting device 22 also changes accordingly. The controller 40 may adjust the rotation amount of the motor 12 to adjust the rotation angle of the mudguard rotating unit 20. The controller 40 may: control the rotation angle of the mudguard rotating unit 20 to be 0° or 360° so that light is irradiated in a direction parallel to the lower body of the vehicle (see FIG. 5A); control the rotation angle of the mudguard rotating unit 20 to be 60° and 120° so that the light is irradiated at an inclined angle toward the ground (see FIGS. 5B, 5C); and control the rotation angle of the mudguard rotating unit 20 to be 180° so that light is irradiated in a direction perpendicular to the ground (see FIG. 5D).

Figure 6:
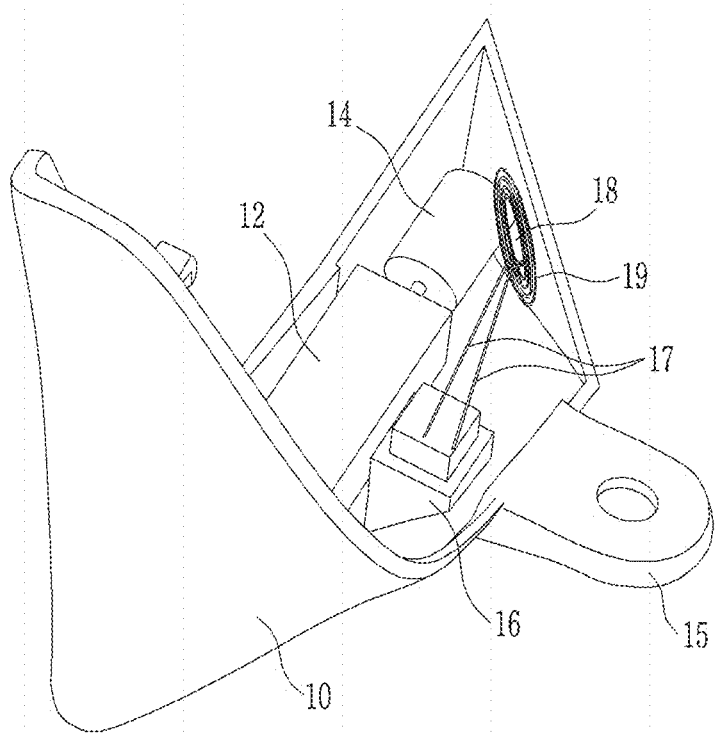
FIG. 6 is a view showing a state in which a heating wire is mounted on the mudguard fixing unit of the vehicle mudguard lighting device according to an embodiment of the present disclosure.
Figure 7:
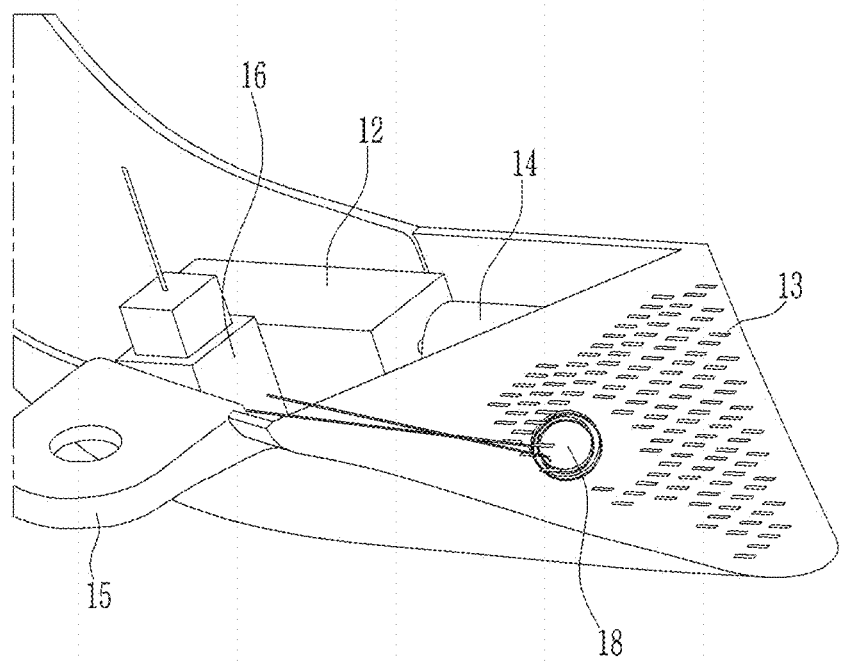
FIG. 7 is a view showing a state in which a brush protrusion is formed in the mudguard fixing unit of the vehicle mudguard lighting device according to an embodiment of the present disclosure.
Figure 8:
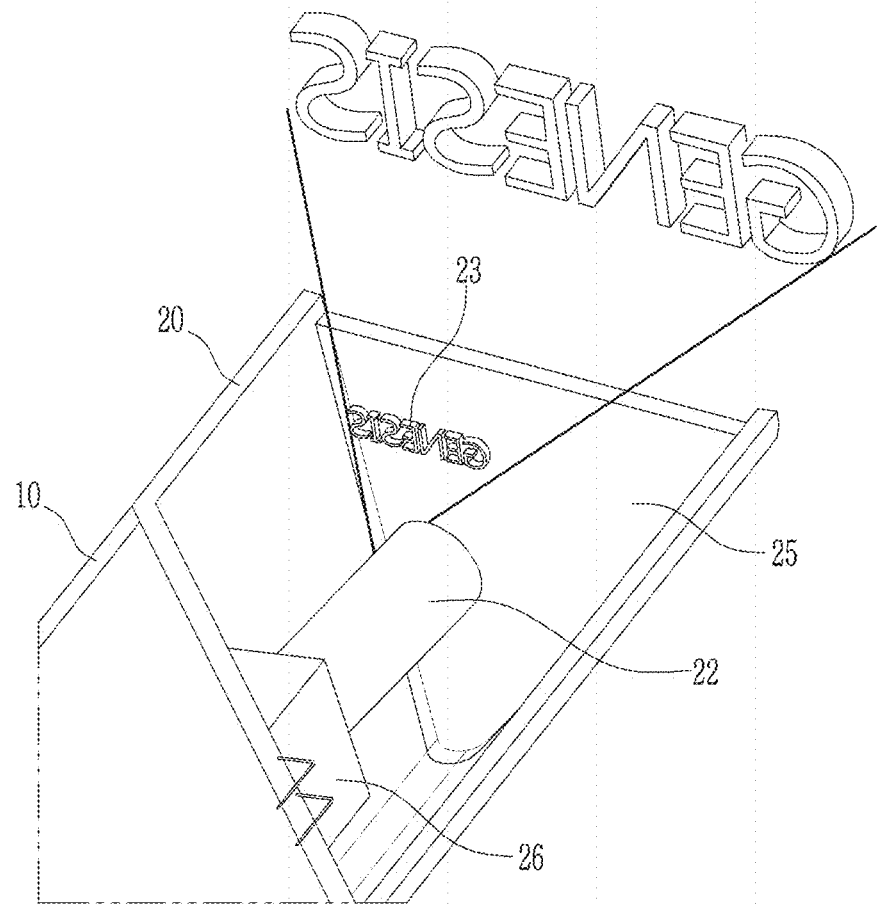
FIG. 8 is a view showing a state in which a transparent cover is installed on the mudguard rotating unit of the vehicle mudguard lighting device according to an embodiment of the present disclosure.

FIG. 6 is a view showing a state in which a heating wire is mounted on the mudguard fixing unit of the vehicle mudguard lighting device according to an embodiment of the present disclosure. FIG. 7 is a view showing a state in which a brush protrusion is formed in the mudguard fixing unit of the vehicle mudguard lighting device according to an embodiment of the present disclosure. FIG. 8 is a view showing a state in which a transparent cover is installed on the mudguard rotating unit of the vehicle mudguard lighting device according to an embodiment of the present disclosure.

Referring to FIG. 6, a heating wire 19 may be mounted around the outer circumference of the opening 18 of the mudguard fixing unit 10. The heating wire 19 may be connected to the wire 17 so as to receive current from the power supply connector 16 and heat may be generated by receiving current. A heating wire 19 may be provided to prevent freezing of the contact surface between the mudguard fixing unit 10 and the mudguard rotating unit 20 in an environment vulnerable to freezing so that it can rotate smoothly. When the external temperature falls below a certain level, the controller 40 may control the heating wire 19 to generate heat. The control unit 40 may control the mudguard fixing unit 10 and the mudguard rotating unit 20 to rotate at a predetermined period.

Referring to FIG. 7, a brush protrusion 13 may be formed on a contact surface of the mudguard fixing unit 10 in contact with the mudguard rotating unit 20. By adding the brush protrusion 13 to the contact surface in an environment vulnerable to contamination, it is possible to prevent contamination from flowing into the contact surface, and when contamination is introduced into the contact surface, it can be removed. The brush protrusions 13 may be evenly distributed over the entire contact surface. By providing the brush protrusions 13, the mudguard fixing unit 10 in contact with the mudguard rotating unit 20 can be smoothly rotated.

Referring to FIG. 8, at the mudguard rotating unit 20, a transparent cover 25 may be installed in a direction perpendicular to the light irradiation direction of the lighting device 22. A pattern 23 is formed on the transparent cover 25 so that a pictogram can be projected when the lighting device 22 is irradiated with light. The pattern 23 may be one or more characters, an object, a facility, an action, or a concept. In addition, the pattern 23 may be formed by separating a transparent portion and an opaque portion by using a method such as masking and painting, printing, vapor deposition, and laser etching. As the lighting device 22 irradiates light toward the transparent cover 25, the pictogram may be expressed, as the light transmittances of the transparent portion and the pattern 23 portion are different.

Thus, according to the present disclosure, it is easy to make different vehicle options regardless of the presence or absence of a side sill molding by the rotating lighting device installed on the vehicle's mudguard.

In addition, even at bright times and places, a lighting effect can be obtained by irradiating light (pictogram) to the shadow area under the vehicle.

In addition, since the irradiation direction of light can be rotated, the individuality of the driver can be expressed and effects such as a mood outside the vehicle can be obtained.

While this disclosure has been described in connection with what is presently considered to be practical embodiments, it is to be understood that the disclosure is not limited to the disclosed embodiments. On the contrary, the disclosure is intended to cover various modifications and equivalent arrangements included within the spirit and scope of the appended claims.

DESCRIPTION OF SYMBOLS

5: wheel guard
10: mudguard fixing unit
12: motor
13: brush protrusion
14: first gear
15: mudguard fixing member
16: power supply connector
17: electric wire
18: opening
19: heating wire 20: mudguard rotating unit
22: lighting device
23: pattern
24: second gear
25: transparent cover
26: device connecting unit
30: external connector
40: controller

What is claimed is:

1. A vehicle mudguard lighting device, comprising:
a mudguard fixing unit attached to the vehicle wheel guard and having a motor therein;
a mudguard rotating unit rotatably attached to the mudguard fixing unit and including a lighting device for irradiating light;
an external connector for supplying power to the motor and the lighting device; and
a controller configured to determine whether power is supplied to the motor and the lighting device, to control whether power is supplied to the external connector, and to adjust a rotation angle of the mudguard rotating unit through the motor.

2. The vehicle mudguard lighting device of claim 1, wherein:
at the mudguard fixing unit,
a first gear is connected to and rotated with a central axis of the motor, and
a power supply connector is configured to transfer the current supplied from the external connector to the mudguard rotating unit.

3. The vehicle mudguard lighting device of claim 2, wherein:
at the mudguard rotating unit,
a second gear is engaged with the first gear to rotate, and
a device connection unit is configured to receive current from the power supply connector and supplying power to the lighting device.

4. The vehicle mudguard lighting device of claim 3, wherein:
the mudguard fixing unit and the mudguard rotating unit are in surface contact with each other at an inclined angle, and
the first gear and the second gear are engaged with each other at an inclined angle.

5. The vehicle mudguard lighting device of claim 4, wherein:
the first gear and the second gear are rotatable hyperboloidal gears.

6. The vehicle mudguard lighting device of claim 4, wherein:
at the contact surface portion of the mudguard fixing unit and the mudguard rotating unit,
an opening is formed in a contact surface of the mudguard fixing unit in contact with the mudguard rotating unit, and
a second gear of the mudguard rotating unit is inserted into the opening to engage with the first gear of the mudguard fixing unit.

7. The vehicle mudguard lighting device of claim 6, wherein:
the power supply connector and the device connection unit are connected by electric wires that are in electrical contact with each other around an outside of the opening.

8. The vehicle mudguard lighting device of claim 6, wherein:
a bearing is mounted around an inner circumference of the opening.

9. The vehicle mudguard lighting device of claim 6, wherein:
a heating wire that is configured to receive current from the power supply connector and to generate heat is mounted around the outer circumference of the opening.

10. The vehicle mudguard lighting device of claim 4, wherein:
a brush protrusion is formed on a contact surface of the mudguard fixing unit in contact with the mudguard rotating unit.

11. The vehicle mudguard lighting device of claim 1, wherein:
at the mudguard rotating unit,
a transparent cover is installed in a direction perpendicular to the light irradiation direction of the lighting device.

12. The vehicle mudguard lighting device of claim 11, wherein:
a pattern is formed on the transparent cover so that a pictogram is projected when the lighting device irradiates light.

13. The vehicle mudguard lighting device of claim 1, wherein:
the lighting device is or includes an LED device.

* * * * *